(12) United States Patent     (10) Patent No.: US 7,848,739 B2
Thorson et al.     (45) Date of Patent: Dec. 7, 2010

(54) METHOD FOR TRANSFER OF USER IDENTITY BETWEEN CDMA WIRELESS COMMUNICATION DEVICES

(75) Inventors: Dean E. Thorson, Grayslake, IL (US); William P. Alberth, Jr., Prairie Grove, IL (US); Hong Zhao, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 518 days.

(21) Appl. No.: 11/321,123

(22) Filed: Dec. 28, 2005

(65) Prior Publication Data

US 2007/0149178 A1     Jun. 28, 2007

(51) Int. Cl.
*H04M 3/00* (2006.01)
*H04W 24/00* (2009.01)

(52) U.S. Cl. ...................... 455/418; 455/425
(58) Field of Classification Search ............ 455/418, 455/425, 419
See application file for complete search history.

(56) References Cited

U.S. PATENT DOCUMENTS

| | | | |
|---|---|---|---|
| 6,349,205 B1 * | 2/2002 | Fang et al. ........... | 455/419 |
| 6,961,567 B1 | 11/2005 | Kuhn | |
| 7,512,685 B2 * | 3/2009 | Lunsford et al. ........... | 709/227 |
| 2001/0005683 A1 | 6/2001 | Zicker et al. | |
| 2001/0041592 A1 * | 11/2001 | Suonpera et al. .......... | 455/557 |
| 2002/0068543 A1 * | 6/2002 | Shah ....................... | 455/351 |
| 2004/0043788 A1 * | 3/2004 | Mittal ...................... | 455/558 |

* cited by examiner

*Primary Examiner*—Michael T Thier
(74) *Attorney, Agent, or Firm*—Ingrassia, Fisher & Lorenz, P.C.

(57) ABSTRACT

A method is provided for transferring user identities between one CDMA wireless communication device (120) and another in a wireless CDMA communication system (100) having a network system controller (140). The network controller (140) receives an activation command from a wireless communication device (120), the activation command including identification information identifying the activating wireless communication device (404). Next, the network controller determines whether the activating wireless communication device is a transferred identity wireless communication device in response to the identification information (424). The network controller then activates the activating wireless communication device with a transferred identity (436) if the activating wireless communication device is determined to be a transferred identity wireless communication device (424).

13 Claims, 7 Drawing Sheets

METHOD FOR TRANSFER OF USER IDENTITY BETWEEN CDMA WIRELESS COMMUNICATION DEVICES

FIELD OF THE INVENTION

The present invention generally relates to wireless communication devices, and more particularly relates to a method for CDMA wireless communication devices to transfer user identities therebetween.

BACKGROUND OF THE INVENTION

The Global System for Mobile Communications (GSM) communication standard allows a user of GSM wireless communication devices to have more than one GSM wireless communication device tied to a single billing record, thereby permitting a user to share a single phone number on two or more wireless communication devices. This is accomplished by utilizing the GSM Subscriber Identity Module (SIM) for storing user identity information. The SIM is a card with memory which can be transferred from one wireless communication device to another. New Code Division Multiple Access (CDMA) wireless communication devices have a similar capability. The Removable User Identity Module (R-UIM) is also a card which can be swapped between phones which would permit a user to transfer his identity from one wireless communication device to another. Yet many CDMA wireless communication devices do not support either SIM or R-UIM user authentication.

Thus, what is needed is a method for transferring user identities between one CDMA wireless communication device and another. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

In accordance with an embodiment of the present invention, a method in a wireless communication system for deactivating a wireless communication device includes the steps of receiving a deactivation command from the deactivating wireless communication device including first identification information identifying the deactivating wireless communication device and second identification information identifying another wireless communication device, and identifying the other wireless communication device as a transferred identity wireless communication device having a transferred identity of the deactivating wireless communication devices in response to the identification information. In accordance with another aspect of the embodiment of the present invention, a method in the wireless communication system includes the steps of receiving an activation command from an activating wireless communication device including identification information identifying the activating wireless communication device, determining whether the activating wireless communication device is a transferred identity wireless communication device in response to the identification information, and activating the activating wireless communication device with a transferred identity if it is determined to be a transferred identity wireless communication device.

A further method is disclosed for deactivating a wireless communication device having an operational identity for operating in a wireless communication system having a system controller. The method includes the step of transmitting a deactivation command to the system controller, the deactivation command including identification information identifying another wireless communication device for transferring the operational identity of the deactivating wireless communication device thereto.

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
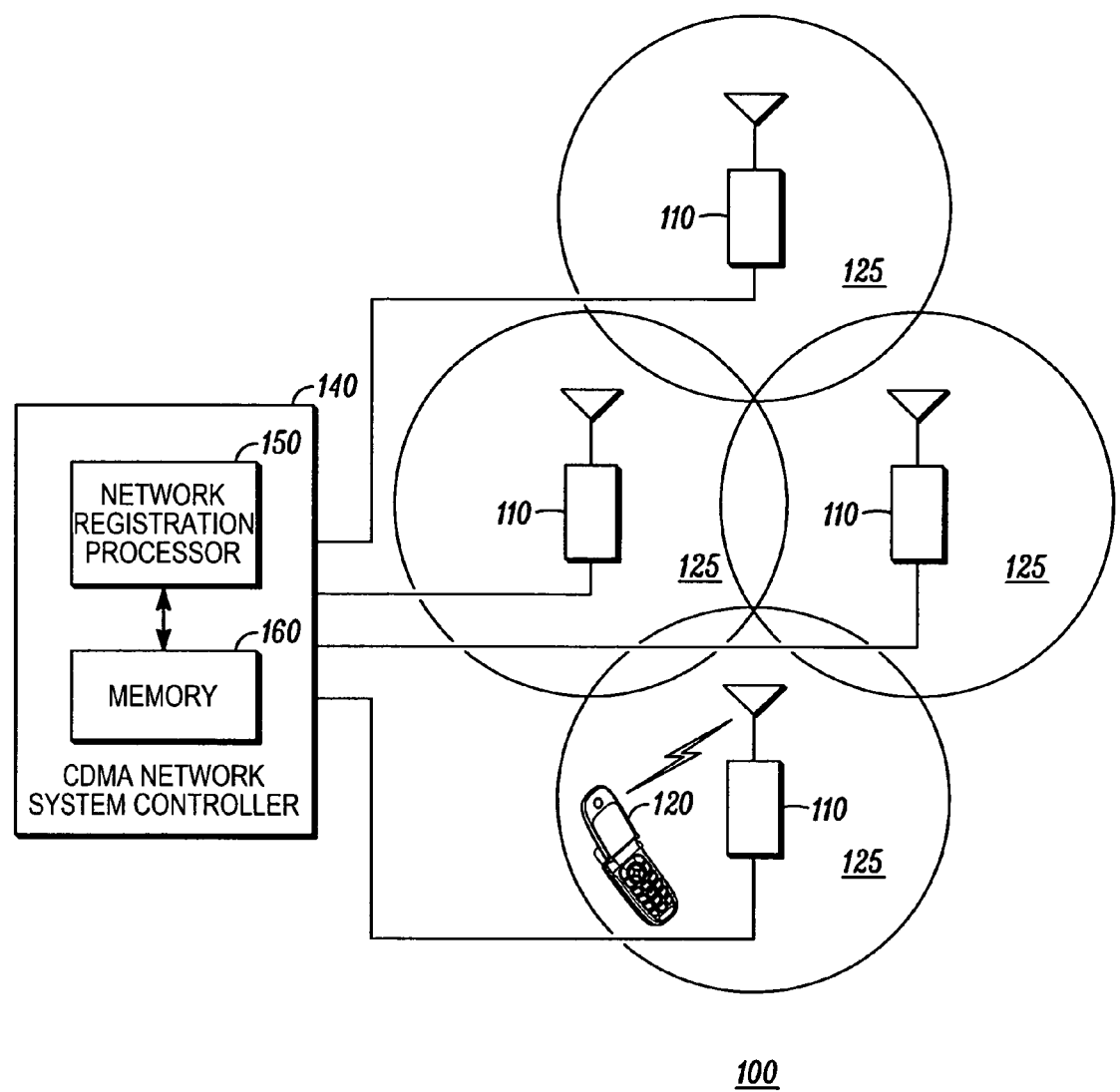
FIG. 1 is a diagram of a wireless communication system in accordance with an embodiment of the present invention.

Referring to FIG. 1, a code division multiple access (CDMA) wireless communication system 100 in accordance with an embodiment of the present invention includes a plurality of base stations 110 and a wireless communication device 120. The plurality of base stations 110 communicate with the wireless communication device 120 via CDMA radio frequency (RF) signals on a plurality of RF channels for wireless communications. Associated with each of the plurality of base stations 110 is a coverage area 125 wherein the wireless communication device 120 can receive RF signals from and transmit RF signals to one of the plurality of base stations 110. The plurality of base stations 110 are coupled to a CDMA network system controller 140 comprising a number of control components, including a network registration processor 150 having a storage device 160 coupled thereto. The network registration processor 150 operates to activate and deactivate wireless communication devices 120 for operation within the CDMA wireless communication system 100 and to verify the activation status of a wireless communication device 120. The CDMA wireless communication system 100 supports Over-The-Air Service Provisioning (OTASP), a standards-based mechanism for a user of a wireless communication device 120 to configure and/or reconfigure the wireless communication device 120 over the wireless communication system 100 without manual intervention and under the control of the CDMA network system controller 140.

Figure 2:
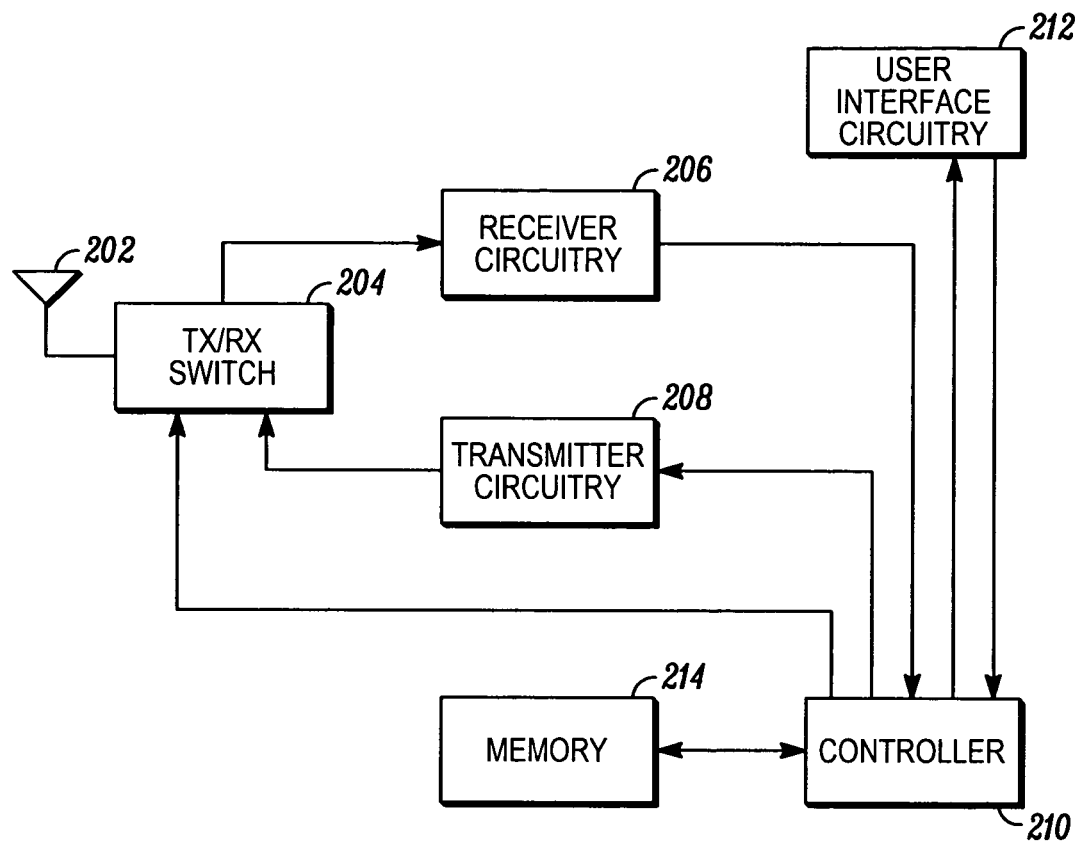
FIG. 2 is a block diagram of a wireless communication device of the communication system of FIG. 1 in accordance with the embodiment of the present invention.

Referring to FIG. 2, a wireless communication device 120 in accordance with the embodiment of the present invention is shown. The wireless communication device 120 includes an antenna 202 for receiving and transmitting radio frequency (RF) signals. A receive/transmit switch 204 selectively couples the antenna 202 to receiver circuitry 206 and transmitter circuitry 208 in a manner familiar to those skilled in the art. The receiver circuitry 206 demodulates and decodes the RF signals to derive information therefrom and is coupled to a controller 210 for providing the decoded information thereto for utilization thereby in accordance with the function(s) of the wireless communication device 120. The controller 210 also provides information to the transmitter circuitry 208 for encoding and modulating information into RF signals for transmission from the antenna 202.

The controller 210 is coupled to user interface circuitry 212 including, for example, a display for presenting video output to a user, a speaker for providing audio output to the user, a microphone for receiving voice input, and user controls, such as a keypad, for receiving user input thereby. The controller 210 is further coupled to a nonvolatile memory device 214 for storing information therein and for retrieving and utilizing information therefrom. When an OTASP signal is received, demodulated and decoded by the receiver circuitry 206 and provided to the controller 210, the controller 210 automatically configures and/or reconfigures the operational characteristics of the wireless communication device 120 without requiring any user inputs from the user interface circuitry 212. OTASP configuration can be initiated by the user either through the wireless communication device 120 (via user interface circuitry 212) or by other contact (e.g., landline telephone call) with the CDMA network system controller 140. In addition, OTASP configuration can be initiated by the CDMA network system controller 140 without any user input.

Figure 3A:
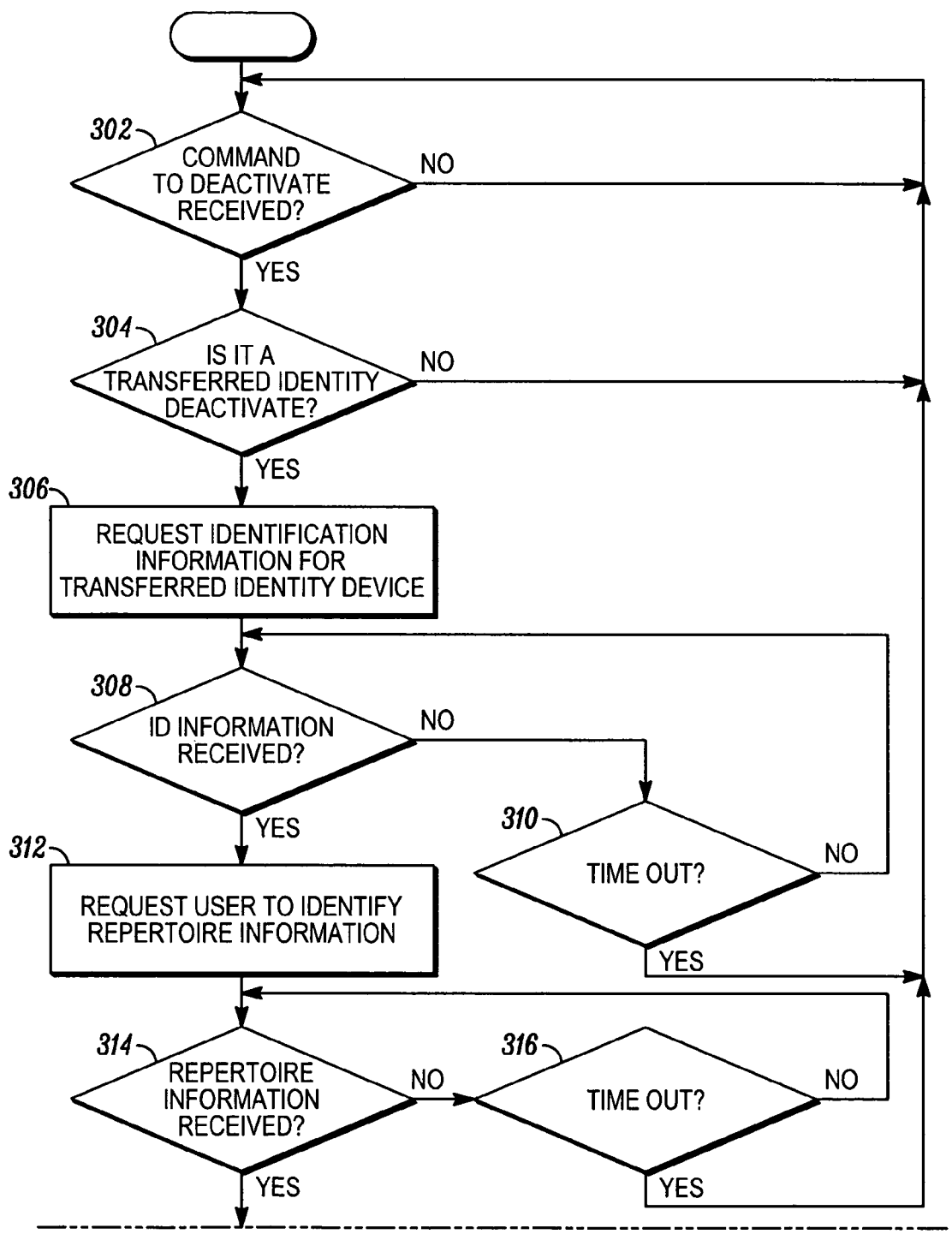
FIG. 3, consisting of FIGS. 3A and 3B, is a flowchart of the de-activation operation of the wireless communication device of FIG. 2 in accordance with the embodiment of the present invention.
Figure 3B:
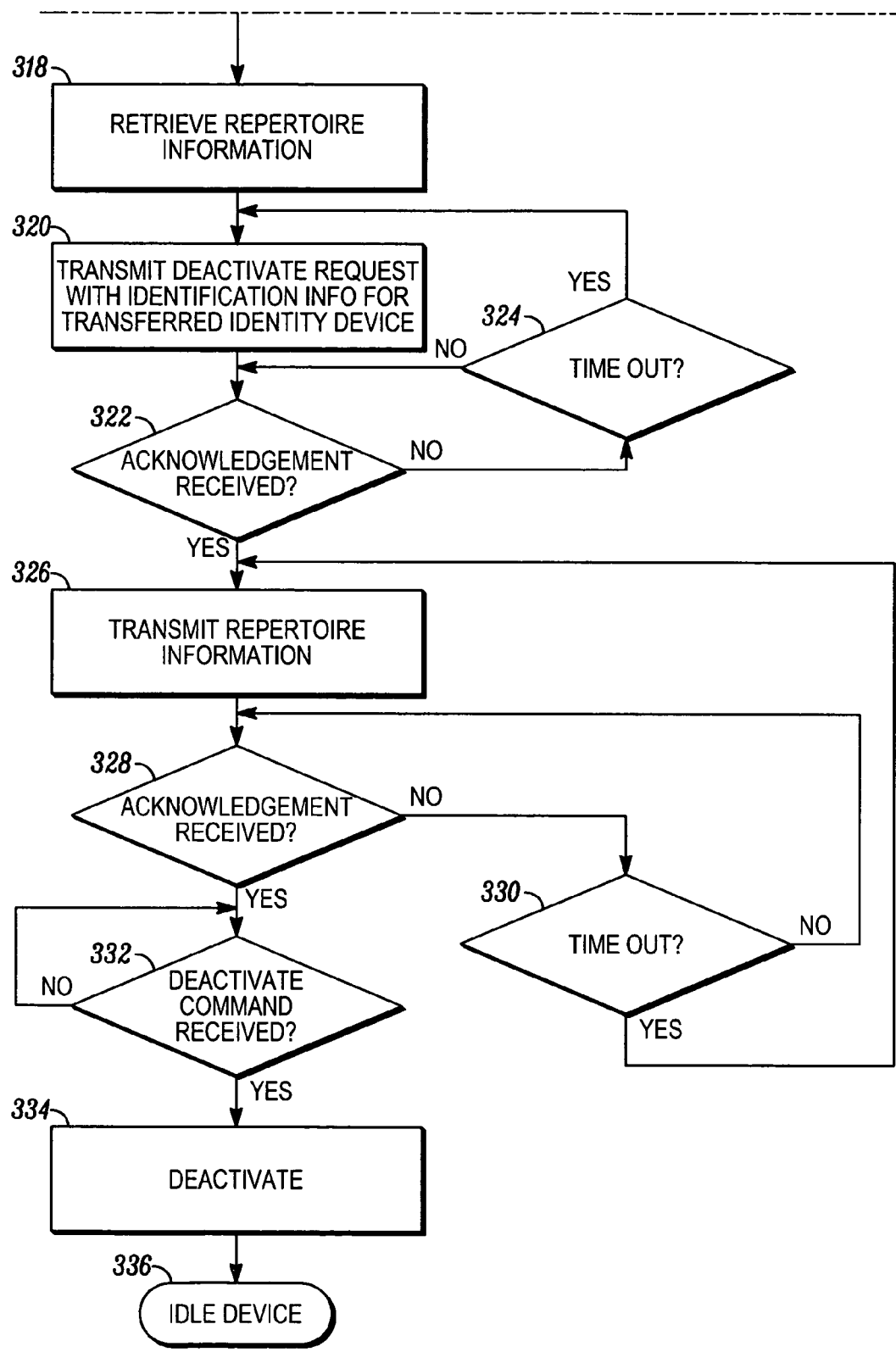

Referring to FIG. 3, consisting of FIGS. 3A and 3B, the operation of the controller 210 of the wireless communication device 120 during deactivation in accordance with the present invention is shown. OTASP supports activation and deactivation of a wireless communication device in response to defined user inputs at user interface circuitry 212 of the wireless communication device 120. A pre-defined user input command to deactivate such as *228 received at the user interface circuitry 212 would initiate deactivation of the wireless communication device 120 in accordance with the present invention. Therefore, deactivation processing in the controller 210 initially awaits detection of a command to deactivate 302 from the user interface circuitry 212. When the user command to deactivate is received 302, processing determines whether the user command indicates deactivation processing and transferring identity in accordance with the present invention 304.

When the user command to deactivate is the predefined transferring identity deactivate command 304, the controller forwards a command to the user interface circuitry 212 to display a request to the user to enter identification information for the transferred identity device (i.e., the wireless communication device to which the identity of the present phone will be transferred) 306. The identification information could be either an electronic serial number (ESN) or a mobile equipment identifier (MEID) of the wireless communication device or other unique information which uniquely identifies the wireless communication device. Processing then awaits reception of the identification information for the transferred identity device by determining whether the identification information is received 308 from the user interface circuitry 212 or whether awaiting reception of the identification information has timed out 310 (i.e., whether a predetermined time has elapsed since the request for identification information 306 was displayed to the user). When reception of the identification information has timed out 310, processing would return to await another command to deactivate 302. As is well known in the art, instead of defaulting to reinitiating the process 302 after timeout 310, a message could be displayed to the user that the process has timed out and he needs to restart, or the user could be reprompted to enter the identification information for the transferred identity device 306, or any of a number of other user-friendly communication techniques could be added without departing from the spirit of the invention.

When the identification information is received for the transferred identity device 308, information is forwarded to the user interface circuitry 212 to present a request to the user to identify any repertoire information that the user wishes to transfer from his phone to the transferred identity device 312. Repertoire information includes phone books, stored messages, stored recent call logs, calendar information, or other stored information personal to the wireless communication device. The user could enter information indicating the repertoire information that he wishes to transfer to the transferred identity device or the controller 210 could initiate a dialog with the user via the user interface circuitry 212 whereby categories of repertoire information are displayed and the user indicates which categories are to be transferred. As with communication between a user and the controller 210, the controller awaits for the reception of information identifying the repertoire information to be transferred 314 or timeout of a predetermined time for response 316. If timeout is reached 316 without receiving any response 314, processing returns to await the next user command 302. Alternatively, as discussed above, any of a number of user-friendly options could be added to the processing to encourage the user to respond or notify the user that he is running out of time or is out of time for response to the request 312.

When the information is received from the user identifying the repertoire information to be transferred 314, the repertoire information is retrieved from the memory 214 and an OTASP deactivate request is generated by the controller 210 and provided to the transmitter circuitry 208 for transmission 320 from the wireless communication device 120 to a base station 110 for provision to the CDMA network system controller 140. In accordance with the present invention, the transmitted deactivate request 320 would include information identifying the deactivate request as a transferring identity deactivation request, first unique information (e.g., ESN or MEID) identifying the wireless communication device 120 transmitting the deactivation command, and second unique information identifying the transferred identity device.

After transmission 320, processing awaits information from the receiver circuitry 206 indicating that the network system controller 140 has acknowledged reception of the deactivate request 322. If no acknowledgement 322 has been received within the predefined timeout period 324, it is assumed that the deactivate request was not received by the network system controller 140 and processing re-transmits the deactivation command 320. When the network system controller 140 acknowledgement has been received 322, a second message including any retrieved repertoire information 318 is generated by the controller 210 and provided to the transmitter circuitry 208 for transmission 326 to the network system controller 140. In a similar manner, after transmission 326, the controller 210 awaits reception of a network system controller 140 acknowledgement 328 and, if no acknowledgment has been received 328 within the timeout period 330, processing retransmits the repertoire information message 326.

As the CDMA network system controller 140 maintains centralized control of the wireless communication system 100, only the network registration processor 150 can deactivate a wireless communication device. Accordingly, processing next awaits reception of the predefined OTASP deactivation command 332 from the network system controller 140. The predefined OTASP deactivation command is a standard OTASP command which the network system controller 140 uses to deactivate a wireless communication device for, for example, nonpayment for service. While the network system controller 140 may transmit the standard OTASP command to deactivate the wireless communication device 120, in accordance with the present invention, the network system controller 140 does not delete the billing records for the wireless communication device being deactivated or alter the billing status thereof in response to determining that the deactivation request is a transferring identity deactivation request. When the deactivation command is received 332, the controller 210 deactivates the wireless communication device 334. Deactivating the wireless communication device 334 places it in an idle device routine 336 where the wireless communication device will only respond to certain commands (OTASP commands from the network system controller 140 or commands from the user interface circuitry 212) to reactivate. While in the idle state, all functionality may be blocked or, in accordance with the operational parameters of the system, the wireless communication device may be able to access and/or use non-communication functions for operation thereof (e.g., if the user had purchased the phone, games, calculator or watch functions may still be operational). Maintaining the billing records of the wireless communication device enables the network registration processor to relink the billing records to a transferred identity device upon activation thereof.

Figure 4A:
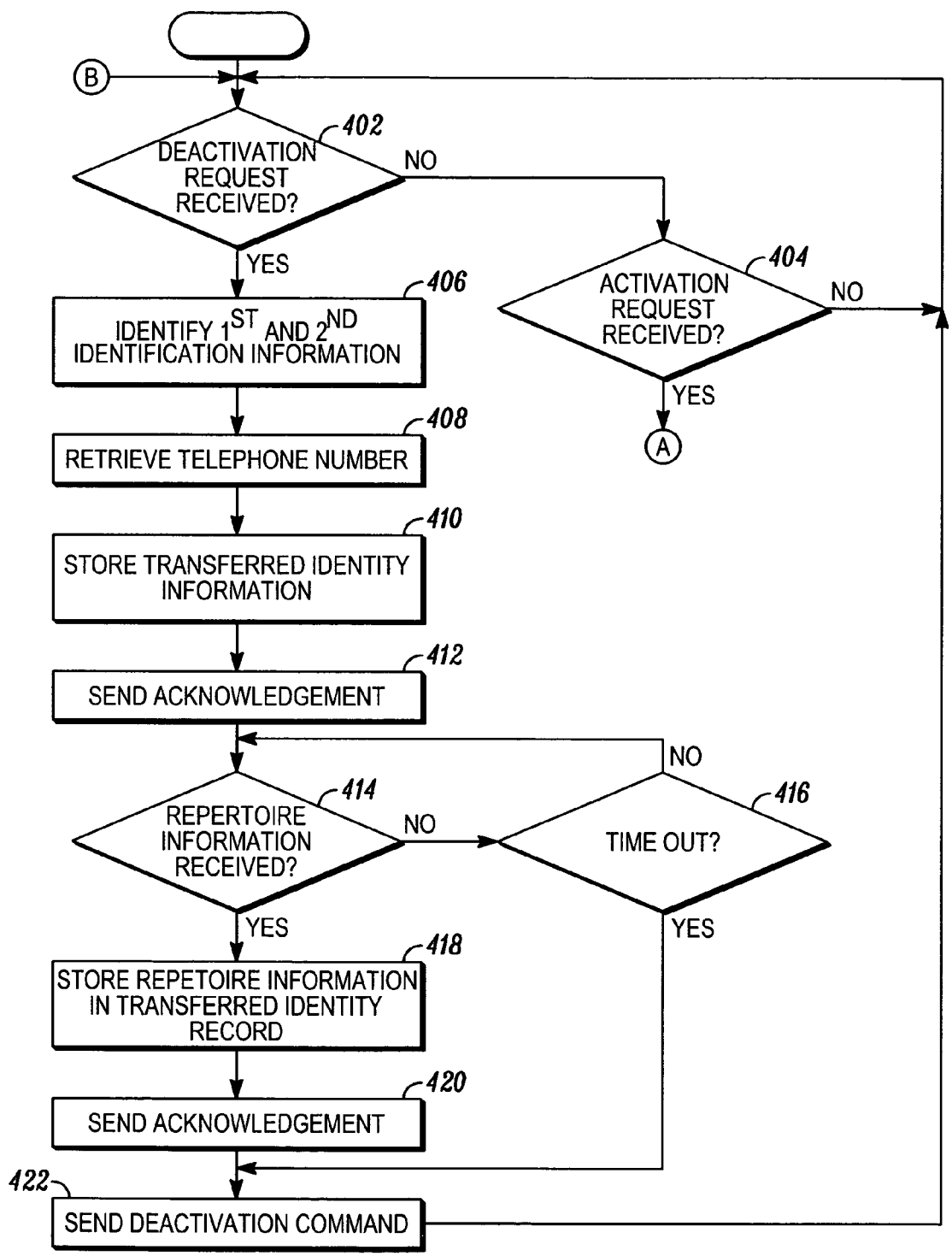
FIG. 4, consisting of FIGS. 4A and 4B, is a flowchart of the de-activation and activation operations of the wireless communication system of FIG. 1 in accordance with the embodiment of the present invention.
Figure 4B:
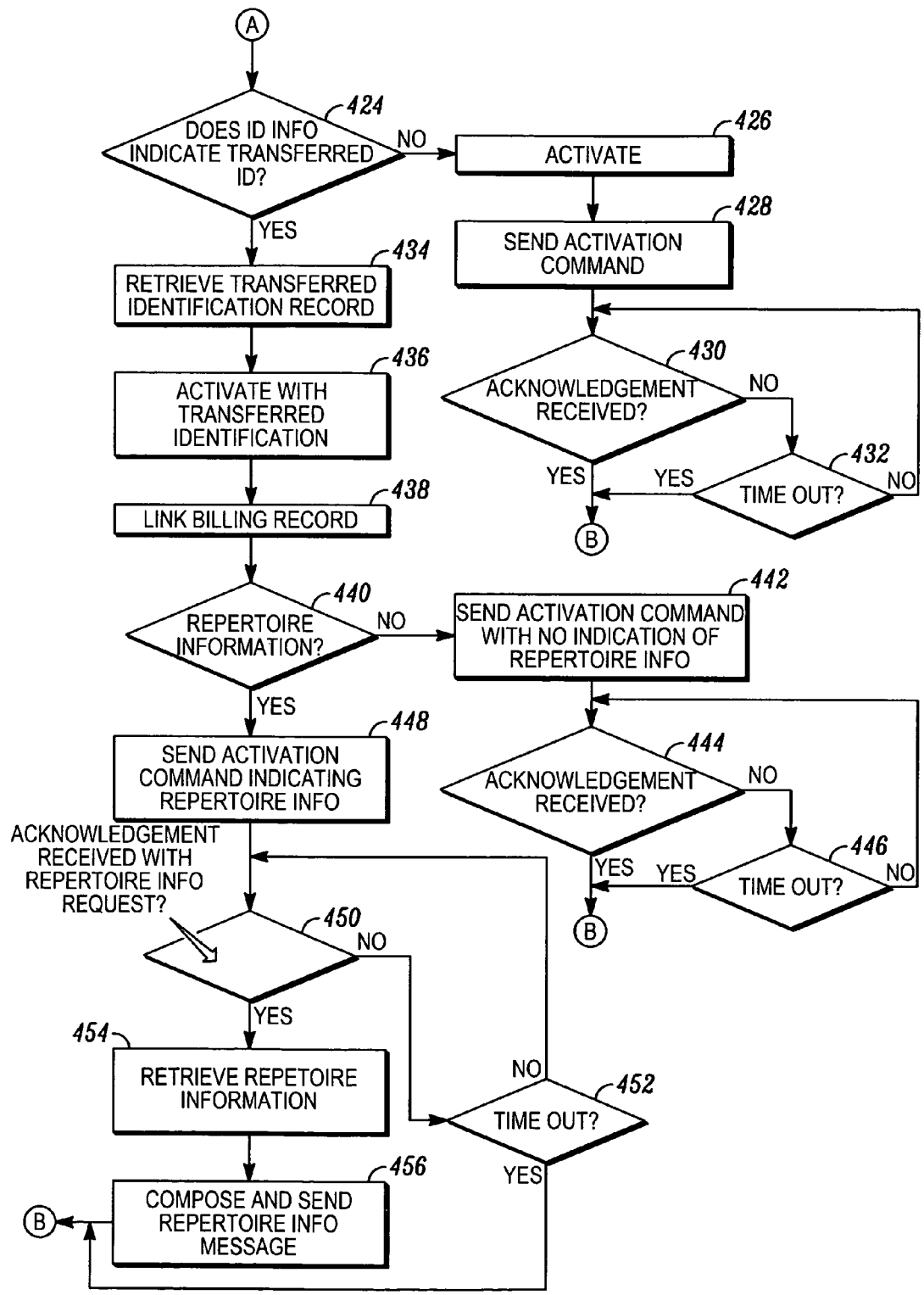

The operation of the network registration processor 150 during activation and deactivation of wireless communication devices is depicted in the flowchart of FIGS. 4A and 4B. Initially, the network registration processor 150 determines whether an OTASP code has been received for either a deactivation request 402 or an activation request 404. If neither a deactivation request 402 nor an activation request 404 has been received, operation of the activation/deactivation process returns to await the next reception of an OTASP code indicating a deactivation request 402 or an activation request 404.

CDMA wireless communication systems have an established OTASP code for wireless communication device activation. In accordance with the present invention an OTASP code for deactivation would indicate that the information received is a deactivation request 402. Processing would identify, from the information received and decoded, first identification information identifying the wireless communication device 120 being deactivated, second identification information and any repertoire information from the wireless communication device being deactivated 406. The first and second identification information could be either electronic serial numbers (ESNs) or mobile equipment identifiers (MEIDs) of the wireless communication devices or other information which uniquely identifies the wireless communication devices 120. Utilizing the first identification information, the telephone number for the wireless communication device 120 being deactivated is retrieved 408 from the storage device 160 and the network registration processor 150 stores the first identification information, the second identification information and the retrieved telephone number in the storage device 160 in a record identified as transferred identity information 410, identifying from the first identification information that the wireless communication device 120 being deactivated is a transferred identity wireless communication device. An acknowledgement message is then sent to the wireless communication device 120 being deactivated that the deactivation command had been received 412.

Processing then awaits reception of repertoire information 414 for a predefined timeout period 416. When the repertoire information is received 414, it is stored in the transferred identity record 418 of the storage device 160 along with the transferred identity information. Reception of receipt of the repertoire information is then acknowledged by sending a repertoire received acknowledgement message 420, and the OTASP deactivation command is sent 422 to the wireless communication device 120 to deactivate it, placing it in an idle operational state. If processing times out 416 without receiving any repertoire information 414, it is assumed that no repertoire information will be sent and processing proceeds to step 422 where the OTASP deactivation command is communicated 422 with (i.e., sent to) the wireless communication device 120.

When the OTASP activation request is received 404 from a wireless communication device, the identification information for the wireless communication device to be activated as received in the activation request 404 is compared with the transferred identity records to determine if the wireless communication device 120 sending the activation request 404 is a transferred identity wireless communication device 424. This identification information could be decoded by the network registration processor 150 or some other hardware or software portion of the CDMA network system controller 140, and the identification information could be either an electronic serial number (ESN) or a mobile equipment identifier (MEID) of the wireless communication device or other information which uniquely identifies the wireless communication device 120 sending the activation request 404. If the activation request 404 is not received from a transferred identity wireless communication device 424, the network registration processor 150 activates the wireless communication device 120 in the CDMA network system 426 and an OTASP activation command is sent 428 to the wireless communication device 120. Processing awaits reception of an acknowledgement 430 from the wireless communication device 120 for a predetermined time 432. As receipt of the acknowledgement 430 is not critical to any next step, when either the acknowledgement is received 430 or processing times out 432, the network registration processor 140 awaits reception of the next deactivation command 402 or activation command 404.

In accordance with the embodiment of the present invention, if the identification information indicates that the wireless communication device 120 is a transferred identity wireless communication device 424, the transferred identity information corresponding to the wireless communication device 120 is retrieved 436 from the storage device 160. The wireless communication device 120 is activated using the transferred information 436, in that the telephone number stored in the transferred identity information (i.e., the telephone number of the wireless communication device deactivated in accordance with the present invention) is assigned to the wireless communication device 120 sending the activation request 404. In addition, the billing record of the wireless communication device deactivated in accordance with the present invention, as identified by the identification information in the transferred identity record, is linked 438 to the activated wireless communication device 120. If the transferred identity record does not contain repertoire information 440, the OTASP activation command is sent to the wireless communication device 120 with an indication that there is no repertoire information to send 442. Processing awaits reception of an acknowledgement 444 from the wireless communication device 120 for a predetermined time 446. When either the acknowledgement is received 444 or processing times out 446, processing of the network registration processor 140 returns to await reception of the next deactivation command 402 or activation command 404.

If, on the other hand, repertoire information is stored in the transferred identity record 440, the activation command is sent to the wireless communication device 120 with an indication that there is repertoire information to follow 448. If no acknowledgement with a request for the repertoire information is received 450 from the wireless communication device 120 within the predetermined time 452, processing returns to await reception of the next deactivation or activation request 402, 404. Having not requested the repertoire information 450, the wireless communication device 120 may, at a later time and apart from any activation or deactivation processing with the network registration processor, request the repertoire information to be retrieved from the storage device 160 and sent to the wireless communication device 120 by sending a request to the CDMA network system controller 140. Alternatively, the CDMA network system controller 140 may be designed to allow only this one chance to retrieve the repertoire information or a limited time (e.g., thirty days) to request the repertoire information after activation 436 before the transferred identity record is deleted from the storage device 160.

When the acknowledgement is received with a request to send the repertoire information 450, the repertoire information is retrieved 454 from the transferred identity record in the storage device 160 and a message is generated and sent to the wireless communication device 120 forwarding the repertoire information thereto 456 for storage therein. Processing then returns to await the next reception of a deactivation request 402 or an activation request 404.

Figure 5:
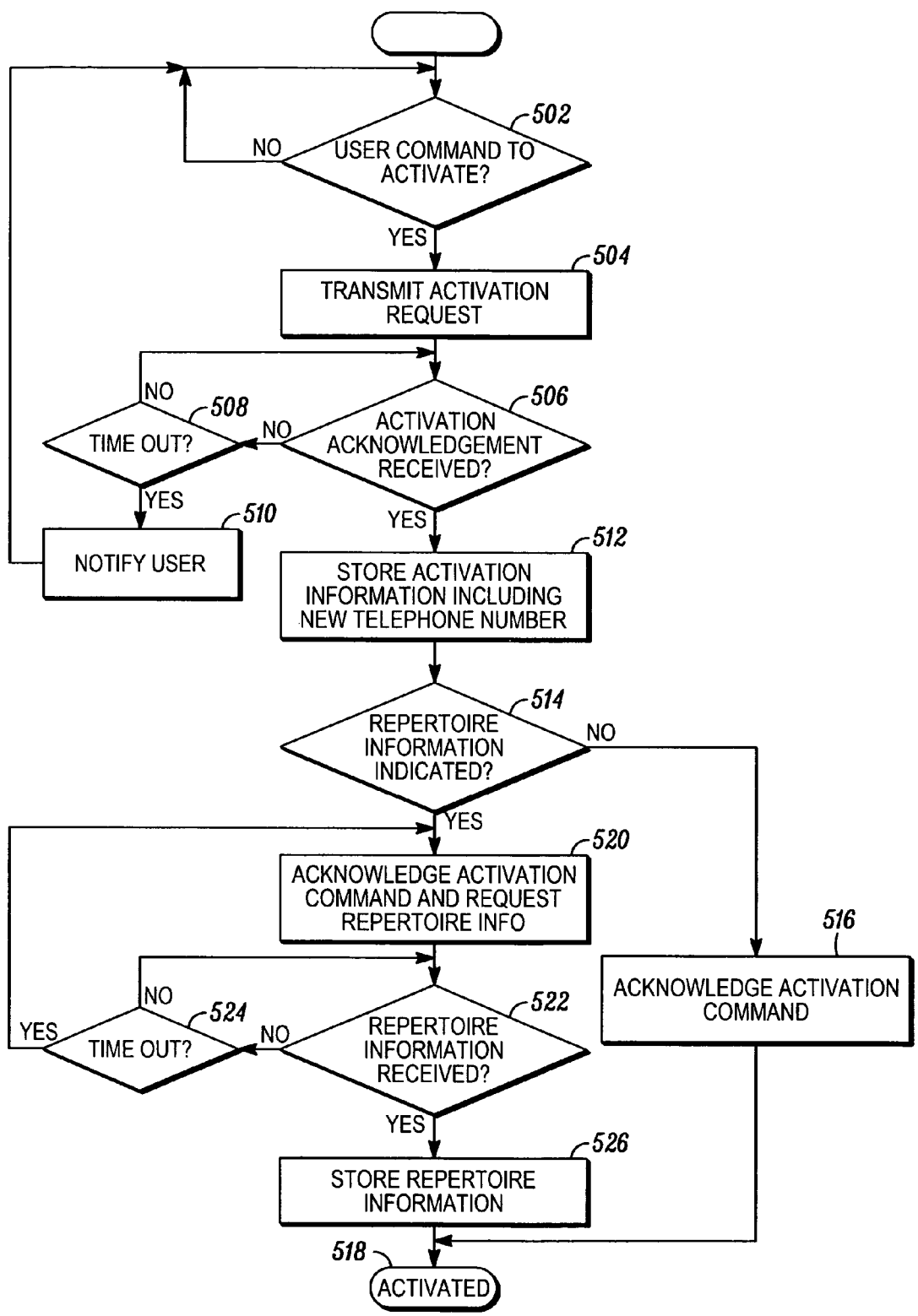
FIG. 5 is a flowchart of the activation operation of the wireless communication device of FIG. 2 in accordance with the embodiment of the present invention.

Referring to FIG. 5, a flowchart of the activation operation of the controller 210 of the wireless communication device 120 in accordance with the embodiment of the present invention is depicted. Operation is initiated when a user activation command is received from the user interface circuitry 214. In response to the user activation command 502, an activation request is generated and provided to the transmitter circuitry 208 for sending an activation request 504 to the network registration processor 150. Processing then awaits reception of an activation acknowledgement message 506 from the network registration processor 150. If an activation acknowledgement message is not received 506 within a predetermined time 508, processing times out 508; the user is notified that activation was not successful 510 and processing returns to await the next user activation command 502. In response to the user notification 510, the user can reattempt to activate the wireless communication device 120.

When the activation acknowledgement message is received 506, the activation information therein (such as the assigned telephone number for the wireless communication device 120) is stored 512 in the memory 214. In accordance with the present invention, the activation acknowledgement message is also checked to see if there is information therein indicating that repertoire information is stored 514 at the network system controller 140. If there is no indication of repertoire information 514, the controller 210 provides an acknowledgement message 516 to the transmitter 208 for transmission to the network registration processor 150. The wireless communication device is now activated 518 for operation in the wireless communication system 100.

If the activation acknowledgement message indicates that repertoire information is stored 514 at the network system controller 140, the controller 210 provides an acknowledgement message and repertoire information request 520 to the transmitter 208 for transmission to the network registration processor 150. Processing then awaits reception of the repertoire information 522. If a predetermined time passes 524 without receiving any repertoire information 522, processing returns to step 520 and the acknowledgement and repertoire information request is resent to the network registration processor 150. When the repertoire information is received 522, it is stored 526 in the memory 214 and the wireless communication device 120 is activated 518 for operation in the wireless communication system 100.

Thus it can be seen that the present invention provides a method for transferring user identities between one CDMA wireless communication device and another. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method in a wireless communication system having a plurality of wireless communication devices and a network system controller, the method performed by the network system controller and comprising the steps of:

receiving a deactivation request from a first wireless communication device of the plurality of wireless communication devices, wherein the deactivation request includes first identification information for the first wireless communication device and second identification information for another wireless communication device of the plurality of wireless communication devices;

after receiving the deactivation request, receiving an activation request from a second wireless communication device of the plurality of wireless communication devices, the activation request including third identification information identifying the second wireless communication device;

determining, in response to receiving the activation request, that the second wireless communication device is a transferred identity wireless communication device when the third identification information compares favorably with the second identification information;

activating the second wireless communication device with a transferred identity in response to determining that the second wireless communication device is a transferred identity wireless communication device, wherein the transferred identity comprises unique information associated with the first wireless communication device, the first wireless communication device having a previously utilized telephone number and a stored billing record associated therewith, and wherein activating the second wireless communication device includes the step of linking the stored billing record of the first wireless communication device to the second wireless communication device; and after activating the second wireless communication device with the transferred identity, coordinating a wireless transfer of repertoire information associated with the first wireless communication device to the second wireless communication device by receiving the repertoire information from the first wireless communication device, and sending the repertoire information to the second wireless communication device, wherein the repertoire information includes information selected from a group consisting of personal phone books, stored messages, stored recent call logs and calendar information.

2. The method of claim 1 wherein the step of activating includes the step of assigning the previously utilized telephone number of the first wireless communication device to the second wireless communication device.

3. The method of claim 2 further comprising the step of communicating a deactivation command to the first wireless communication device.

4. The method of claim 1 wherein the second identification information is selected from a group consisting of an Electronic Serial Number (ESN) of the second wireless communication device and a Mobile Equipment Identifier (MEID) of the second wireless communication device.

5. The method of claim 1 wherein the wireless communication system is a Code Division Multiple Access (CDMA) wireless communication system and wherein the step of receiving an activation request comprises the step of receiving an Over-The-Air Service Provisioning (OTASP) activation request from the second wireless communication device, the OTASP activation request also including the unique information.

6. The method of claim 1 wherein the wireless communication system is a Code Division Multiple Access (CDMA) wireless communication system and wherein the step of receiving a deactivation request comprises the step of receiving an Over-The-Air Service Provisioning (OTASP) deactivation request from the first wireless communication device, the OTASP deactivation request also including the unique information.

7. The method of claim 1, wherein the step of coordinating the wireless transfer of the repertoire information further comprises the step of:
receiving a repertoire information request from the second wireless communication device, wherein sending the repertoire information to the second wireless communication device is performed in response to receiving the repertoire information request.

8. The method of claim 1, further comprising storing a telephone number of the second wireless communication device as the unique information.

9. A method in a wireless communication system having a plurality of wireless communication devices and a network system controller, the method performed by the network system controller and comprising the steps of:
wirelessly receiving a deactivation request from a first one of the plurality of wireless communication devices, the deactivation request including identification information identifying the first one of the plurality of wireless communication devices and a second one of the plurality of wireless communication devices;
wirelessly receiving repertoire information associated with the first one of the plurality of wireless communication devices, wherein the repertoire information is selected from a group consisting of personal phone books, stored messages, stored recent call logs and calendar information;
wirelessly receiving an activation request from the second one of the plurality of wireless communication devices;
determining in response to receiving the activation request, that said second one of the plurality of wireless communication devices is a transferred identity wireless communication device based on the identification information;
deactivating said first one of the plurality of wireless communication devices in response to determining that said second one of the plurality of wireless communication devices is a transferred identity wireless communication device;
activating said second one of the plurality of wireless communication devices with a transferred identity, wherein the step of activating includes the step of linking a stored billing record of said first one of the plurality of wireless communication devices to said second one of the plurality of wireless communication devices, and sending an activation command to the second one of the wireless communication devices, wherein the activation command includes an indication of the repertoire information;
receiving a repertoire information request from the second one of the plurality of wireless communication devices; and
sending the repertoire information to the second one of the plurality of wireless communication devices in response to receiving the repertoire information request.

10. The method of claim 9 wherein the step of activating includes the step of assigning a previously utilized telephone number of said first one of the plurality of wireless communication devices to said second one of the plurality of wireless communication devices.

11. The method of claim 9 wherein the wireless communication system is a Code Division Multiple Access (CDMA) wireless communication system and wherein the step of deactivating said first one of the plurality of wireless communication devices comprises the step of generating an Over-The-Air Service Provisioning (OTASP) deactivation command and transmitting the OTASP deactivation command to said first one of the plurality of wireless communication devices in response to receiving the deactivation request from the first one of the plurality of wireless communication devices.

12. The method of claim 10 wherein the wireless communication system is a Code Division Multiple Access (CDMA) wireless communication system and wherein the step of activating said second one of the plurality of wireless communication devices comprises the step of generating an Over-The-Air Service Provisioning (OTASP) activation command and transmitting the OTASP activation command to said second one of the plurality of wireless communication devices in response to receiving the activation request from said second one of the plurality of wireless communication devices, the OTASP activation command generated and transmitted to said second one of the plurality of wireless communication devices for activating said second one of the plurality of wireless communication devices with the transferred identity from said first one of the plurality of wireless communication devices.

13. A method in a wireless communication system having a plurality of wireless communication devices and a network system controller, the method performed by the network system controller and comprising the steps of:
wirelessly receiving a deactivation request from a first one of the plurality of wireless communication devices, the deactivation request comprising identification information identifying the first one of the plurality of wireless communication devices and a second one of the plurality of wireless communication devices, and first unique information identifying said first one of the plurality of wireless communication devices and second unique information identifying said second one of the plurality of wireless communication devices;

wirelessly requesting identification of repertoire information associated with the first one of the plurality of wireless communication devices, the identification information thereafter identifying the first one of the plurality of wireless communication devices and the second one of the plurality of wireless communication devices and the repertoire information associated with the first one of the plurality of wireless communication devices;

wirelessly receiving the repertoire information associated with the first one of the plurality of wireless communication devices, wherein the repertoire information is selected from a group consisting of personal phone books, stored messages, stored recent call logs and calendar information;

wirelessly receiving an activation request from the second one of the plurality of wireless communication devices;

determining in response to receiving the activation request, that said second one of the plurality of wireless communication devices is a transferred identity wireless communication device based on the identification information;

deactivating said first one of the plurality of wireless communication devices in response to determining that said second one of the plurality of wireless communication devices is a transferred identity wireless communication device; and activating said second one of the plurality of wireless communication devices with a transferred identity, wherein the step of activating includes the step of linking a stored billing record of said first one of the plurality of wireless communication devices to said second one of the plurality of wireless communication devices.

* * * * *